United States Patent
Blaum et al.

(10) Patent No.: US 10,055,278 B2
(45) Date of Patent: Aug. 21, 2018

(54) AUTONOMIC PARITY EXCHANGE IN DATA STORAGE SYSTEMS

(71) Applicant: International Business Machines Corporation, Armonk, NY (US)

(72) Inventors: Mario Blaum, San Jose, CA (US); Steven R. Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 14/929,219

(22) Filed: Oct. 30, 2015

(65) Prior Publication Data

US 2017/0123888 A1 May 4, 2017

(51) Int. Cl.
  *G06F 11/00* (2006.01)
  *G06F 11/07* (2006.01)
  *G06F 11/10* (2006.01)

(52) U.S. Cl.
  CPC ........ *G06F 11/0793* (2013.01); *G06F 11/073* (2013.01); *G06F 11/108* (2013.01); *G06F 11/1076* (2013.01); *G06F 11/1092* (2013.01)

(58) Field of Classification Search
  CPC .... G06F 11/0793; G06F 11/073; G06F 11/08; G06F 11/1076; G06F 11/108;
  (Continued)

(56) References Cited

U.S. PATENT DOCUMENTS

| 6,138,125 A | 10/2000 | DeMoss |
| 7,281,177 B2 | 10/2007 | Hetzler et al. |

(Continued)

FOREIGN PATENT DOCUMENTS

| CN | 1906592 A | 1/2007 |
| CN | 101339524 A | 1/2009 |

(Continued)

OTHER PUBLICATIONS

International Search Report and Written Opinion from PCT Application No. PCT/IB2016/055273, dated Dec. 15, 2016.

(Continued)

*Primary Examiner* — Bryce P Bonzo
*Assistant Examiner* — Anthony J Amoroso
(74) *Attorney, Agent, or Firm* — Zilka-Kotab, P.C.

(57) ABSTRACT

A computer-implemented method is provided for increasing the failure tolerance of an array of storage elements in a storage system. The computer-implemented method includes configuring an array to include a plurality of storage elements in n>1 sets of storage elements. The computer-implemented method also includes configuring an erasure-correcting code such that at least one column of the storage elements of the array stores row parity information, and at least one row of the storage elements of the array stores column parity information. Still yet, the computer-implemented method includes, subsequent to a failure of one of the storage elements storing data, selecting a recipient storage element from the array, and rebuilding at least a portion of the data onto the recipient storage element by performing a parity exchange operation that retains a failure tolerance of the set of storage elements containing the failed storage element.

21 Claims, 12 Drawing Sheets

(58) Field of Classification Search
CPC ............. G06F 11/1084; G06F 11/1088; G06F 11/1092; G06F 11/1096; G06F 11/1448
See application file for complete search history.

(56) References Cited

U.S. PATENT DOCUMENTS

| | | | | |
|---|---|---|---|---|
| 7,562,281 | B2* | 7/2009 | Hetzler | G06F 11/1084 714/777 |
| 7,788,569 | B2* | 8/2010 | Hetzler | G06F 11/1076 714/777 |
| 8,918,701 | B2 | 12/2014 | Blaum et al. | |
| 9,870,284 | B2 | 1/2018 | Blaum et al. | |
| 2005/0086575 | A1* | 4/2005 | Hassner | G06F 11/1076 714/766 |
| 2012/0198195 | A1* | 8/2012 | Wylie | G06F 11/1076 711/170 |
| 2014/0310571 | A1* | 10/2014 | Fetterly | G06F 11/1088 714/764 |
| 2014/0380126 | A1 | 12/2014 | Yekhanin et al. | |
| 2016/0350186 | A1 | 12/2016 | Blaum et al. | |

FOREIGN PATENT DOCUMENTS

| | | |
|---|---|---|
| CN | 101923501 A | 12/2010 |
| CN | 102420016 A | 4/2012 |

OTHER PUBLICATIONS

Blaum et al. "Construction of Partial MDS (PMDS) and Sector-Disk (SD) Codes with Two Global Parity Symbols," arxiv.org, Jan. 19, 2014, 5 pages.

Li et al. "STAIR Codes: A General Family of Erasure Codes for Tolerating Device and Sector Failures in Practical Storage Systems," 12th USENIX Conference on File and Storage Technologies, Feb. 17-20, 2014, pp. 147-162.

Kamath et al., "Codes With Local Regeneration and Erasure Correction," IEEE Transactions on Information Theory, vol. 60, No. 8, Aug. 2014, pp. 4637-4660.

Blaum et al., U.S. Appl. No. 14/722,356, filed May 27, 2015.

* cited by examiner

300

| | |
|---|---|
| 0;0 | Data |
| 0;9 | Column parity |
| 7;3 | Row parity |
| 6;8 | Global parity |

| | 322 | 324 | 326 | 328 | 330 | 332 | 334 | 336 |
|---|---|---|---|---|---|---|---|---|
| 302 | 0;0 | 1;0 | 2;0 | 3;0 | 4;0 | 5;0 | 6;0 | 7;0 |
| 304 | 0;1 | 1;1 | 2;1 | 3;1 | 4;1 | 5;1 | 6;1 | 7;1 |
| 306 | 0;2 | 1;2 | 2;2 | 3;2 | 4;2 | 5;2 | 6;2 | 7;2 |
| 308 | 0;3 | 1;3 | 2;3 | 3;3 | 4;3 | 5;3 | 6;3 | 7;3 |
| 310 | 0;4 | 1;4 | 2;4 | 3;4 | 4;4 | 5;4 | 6;4 | 7;4 |
| 312 | 0;5 | 1;5 | 2;5 | 3;5 | 4;5 | 5;5 | 6;5 | 7;5 |
| 314 | 0;6 | 1;6 | 2;6 | 3;6 | 4;6 | 5;6 | 6;6 | 7;6 |
| 316 | 0;7 | 1;7 | 2;7 | 3;7 | 4;7 | 5;7 | 6;7 | 7;7 |
| 318 | 0;8 | 1;8 | 2;8 | 3;8 | 4;8 | 5;8 | 6;8 | 7;8 |
| 320 | 0;9 | 1;9 | 2;9 | 3;9 | 4;9 | 5;9 | 6;9 | 7;9 |

| | | | | | | | |
|---|---|---|---|---|---|---|---|
| 0;0 | Data | | | | | | |
| 0;9 | Column parity | | | | | | |
| 7;3 | Row parity | | | | | | |
| 6;8 | Global parity | | | | | | |
| 2;1 | Failed or Missing | | | | | | |
| 2;2 | Data (exchanged) | | | | | | |

| 0;0 | 1;0 | 2;0 | 3;0 | 4;0 | 5;0 | 6;0 | 7;0 |
|---|---|---|---|---|---|---|---|
| 0;1 | 1;1 | 2;1 | 3;1 | 4;1 | 5;1 | 6;1 | 7;1 |
| 0;2 | 1;2 | 2;2 | 3;2 | 4;2 | 5;2 | 6;2 | 7;2 |
| 0;3 | 1;3 | 2;3 | 3;3 | 4;3 | 5;3 | 6;3 | 7;3 |
| 0;4 | 1;4 | 2;4 | 3;4 | 4;4 | 5;4 | 6;4 | 7;4 |
| 0;5 | 1;5 | 2;5 | 3;5 | 4;5 | 5;5 | 6;5 | 7;5 |
| 0;6 | 1;6 | 2;6 | 3;6 | 4;6 | 5;6 | 6;6 | 7;6 |
| 0;7 | 1;7 | 2;7 | 3;7 | 4;7 | 5;7 | 6;7 | 7;7 |
| 0;8 | 1;8 | 2;8 | 3;8 | 4;8 | 5;8 | 6;8 | 7;8 |
| 0;9 | 1;9 | 2;9 | 3;9 | 4;9 | 5;9 | 6;9 | 7;9 |

| 0;0 | Data |
| 0;9 | Column parity |
| 7;3 | Row parity |
| 6;8 | Global parity |
| 2;1 | Failed or Missing |
| 2;2 | Data (exchanged) |

| 0;0 | 1;0 | 2;0 | 3;0 | 4;0 | 5;0 | 6;0 | 7;0 |
|---|---|---|---|---|---|---|---|
| 0;1 | 1;1 | 2;9 | 3;1 | 4;1 | 5;1 | 6;1 | 7;1 |
| 0;2 | 1;2 | 2;2 | 3;2 | 4;2 | 5;2 | 6;2 | 7;2 |
| 0;3 | 1;3 | 2;3 | 3;3 | 4;3 | 5;3 | 6;3 | 7;3 |
| 0;4 | 1;4 | 2;4 | 3;4 | 4;4 | 5;4 | 6;4 | 7;4 |
| 0;5 | 1;5 | 2;5 | 3;5 | 4;5 | 5;5 | 6;5 | 7;5 |
| 0;6 | 1;6 | 2;6 | 3;6 | 4;6 | 5;6 | 6;6 | 7;6 |
| 0;7 | 1;7 | 2;7 | 3;7 | 4;7 | 5;7 | 6;7 | 7;7 |
| 0;8 | 1;8 | 2;8 | 3;8 | 4;8 | 5;8 | 6;8 | 7;8 |
| 0;9 | 1;9 | 2;1 | 3;9 | 4;9 | 5;9 | 6;9 | 7;9 |

| | |
|---|---|
| 0;0 | Data |
| 0;9 | Column parity |
| 7;3 | Row parity |
| 6;8 | Global parity |
| 2;1 | Failed or Missing |
| 2;2 | Data (exchanged) |

| 0;0 | 1;0 | 2;0 | 3;0 | 4;0 | 5;0 | 6;0 | 7;0 |
|---|---|---|---|---|---|---|---|
| 0;1 | 1;1 | 2;9 | 3;1 | 4;1 | 5;1 | 6;1 | 7;1 |
| 0;2 | 1;2 | 2;2 | 3;2 | 4;2 | 5;2 | 6;2 | 7;2 |
| 0;3 | 1;3 | 2;3 | 3;3 | 4;3 | 5;3 | 6;3 | 7;3 |
| 0;4 | 1;4 | 2;4 | 3;4 | 4;4 | 5;4 | 6;4 | 7;4 |
| 0;5 | 1;5 | 2;5 | 3;5 | 4;5 | 5;5 | 6;5 | 7;5 |
| 0;6 | 1;6 | 2;6 | 3;6 | 4;6 | 5;6 | 6;6 | 7;6 |
| 0;7 | 1;7 | 2;7 | 3;7 | 4;7 | 5;7 | 6;7 | 7;7 |
| 0;8 | 1;8 | 2;8 | 3;8 | 4;8 | 5;8 | 6;8 | 7;8 |
| 0;9 | 1;9 | 2;1 | 3;9 | 4;9 | 5;9 | 6;9 | 7;9 |

| | |
|---|---|
| 0;0 | Data |
| 0;9 | Column parity |
| 7;3 | Row parity |
| 6;8 | Global parity |
| 2;1 | Failed or Missing |
| 2;2 | Data (exchanged) |

322  326

| 0;0 | 1;0 | 0;9 | 3;0 | 4;0 | 5;0 | 6;0 | 7;0 |
|---|---|---|---|---|---|---|---|
| 0;1 | 1;1 | 2;9 | 3;1 | 4;1 | 5;1 | 6;1 | 7;1 |
| 0;2 | 1;2 | 2;2 | 3;2 | 4;2 | 5;2 | 6;2 | 7;2 |
| 0;3 | 1;3 | 2;3 | 3;3 | 4;3 | 5;3 | 6;3 | 7;3 |
| 0;4 | 1;4 | 2;4 | 3;4 | 4;4 | 5;4 | 6;4 | 7;4 |
| 0;5 | 1;5 | 2;5 | 3;5 | 4;5 | 5;5 | 6;5 | 7;5 |
| 0;6 | 1;6 | 2;6 | 3;6 | 4;6 | 5;6 | 6;6 | 7;6 |
| 0;7 | 1;7 | 2;7 | 3;7 | 4;7 | 5;7 | 6;7 | 7;7 |
| 0;8 | 1;8 | 2;8 | 3;8 | 4;8 | 5;8 | 6;8 | 7;8 |
| 2;0 | 1;9 | 2;1 | 3;9 | 4;9 | 5;9 | 6;9 | 7;9 |

| | | | | | | | |
|---|---|---|---|---|---|---|---|
| 0;0 | | Data | | | | | |
| 0;9 | | Column parity | | | | | |
| 7;3 | | Row parity | | | | | |
| 6;8 | | Global parity | | | | | |
| 2;1 | | Failed or Missing | | | | | |
| 2;2 | | Data (exchanged) | | | | | |

| 0;0 | 1;0 | 0;9 | 3;0 | 4;0 | 5;0 | 6;0 | 7;0 |
|---|---|---|---|---|---|---|---|
| 0;1 | 1;1 | 2;9 | 3;1 | 4;1 | 5;1 | 6;1 | 7;1 |
| 0;2 | 1;2 | 1;9 | 3;2 | 4;2 | 5;2 | 6;2 | 7;2 |
| 0;3 | 1;3 | 7;9 | 3;3 | 4;3 | 5;3 | 6;3 | 7;3 |
| 0;4 | 1;4 | 4;9 | 3;4 | 4;4 | 5;4 | 6;4 | 7;4 |
| 0;5 | 1;5 | 3;9 | 3;5 | 4;5 | 5;5 | 6;5 | 7;5 |
| 0;6 | 1;6 | 6;9 | 3;6 | 4;6 | 5;6 | 6;6 | 7;6 |
| 0;7 | 1;7 | 2;7 | 3;7 | 4;7 | 5;7 | 6;7 | 7;7 |
| 0;8 | 1;8 | 5;9 | 3;8 | 4;8 | 5;8 | 6;8 | 7;8 |
| 2;0 | 2;2 | 2;1 | 2;5 | 2;4 | 2;8 | 2;6 | 2;3 |

320 — (row)
322, 324, 326, 328, 330, 332, 334, 336

| | |
|---|---|
| 0;0 | Data |
| 0;9 | Column parity |
| 7;3 | Row parity |
| 6;8 | Global parity |
| 2;1 | Failed or Missing |
| 2;2 | Data (exchanged) |

| 0;0 | 1;0 | 0;9 | 3;0 | 4;0 | 5;0 | 6;0 | 7;0 |
|---|---|---|---|---|---|---|---|
| 0;1 | 1;1 | 2;9 | 3;1 | 4;1 | 5;1 | 6;1 | 7;1 |
| 0;2 | 1;2 | 1;9 | 3;2 | 4;2 | 5;2 | 6;2 | 7;2 |
| 0;3 | 1;3 | 7;9 | 3;3 | 4;3 | 5;3 | 6;3 | 7;3 |
| 0;4 | 1;4 | 4;9 | 3;4 | 4;4 | 5;4 | 6;4 | 7;4 |
| 0;5 | 1;5 | 3;9 | 3;5 | 4;5 | 5;5 | 6;5 | 7;5 |
| 0;6 | 1;6 | 6;9 | 3;6 | 4;6 | 5;6 | 6;6 | 7;6 |
| 0;7 | 1;7 | 2;7 | 3;7 | 4;7 | 5;7 | 6;7 | 7;7 |
| 0;8 | 1;8 | 5;9 | 3;8 | 4;8 | 5;8 | 6;8 | 7;8 |
| 2;0 | 2;2 | 2;1 | 2;5 | 2;4 | 2;8 | 2;6 | 2;3 |

| | |
|---|---|
| 0;0 | Data |
| 0;9 | Column parity |
| 7;3 | Row parity |
| 6;8 | Global parity |
| 2;1 | Failed or Missing |
| 2;2 | Data (exchanged) |

336

| 0;0 | 1;0 | 0;9 | 3;0 | 4;0 | 5;0 | 6;0 | 7;0 |
|---|---|---|---|---|---|---|---|
| 0;1 | 1;1 | 2;9 | 3;1 | 4;1 | 5;1 | 6;1 | 7;1 |
| 0;2 | 1;2 | 1;9 | 3;2 | 4;2 | 5;2 | 6;2 | 7;2 |
| 0;3 | 1;3 | 7;9 | 3;3 | 4;3 | 5;3 | 6;3 | 7;3 |
| 0;4 | 1;4 | 4;9 | 3;4 | 4;4 | 5;4 | 6;4 | 7;4 |
| 0;5 | 1;5 | 3;9 | 3;5 | 4;5 | 5;5 | 6;5 | 7;5 |
| 0;6 | 1;6 | 6;9 | 3;6 | 4;6 | 5;6 | 6;6 | 7;6 |
| 0;7 | 1;7 | 2;7 | 3;7 | 4;7 | 5;7 | 6;7 | 7;7 |
| 0;8 | 1;8 | 5;9 | 3;8 | 4;8 | 5;8 | 6;8 | 7;8 |
| 2;0 | 2;2 | 2;1 | 2;5 | 2;4 | 2;8 | 2;6 | 2;3 |

| | | | | | | | |
|---|---|---|---|---|---|---|---|
| 0;0 | 1;0 | 0;9 | 3;0 | 4;0 | 5;0 | 6;0 | 7;0 |
| 0;1 | 1;1 | 2;9 | 3;1 | 4;1 | 5;1 | 6;1 | 7;1 |
| 0;2 | 1;2 | 1;9 | 3;2 | 4;2 | 5;2 | 6;2 | 7;2 |
| 0;3 | 1;3 | 7;9 | 3;3 | 4;3 | 5;3 | 6;3 | 7;3 |
| 0;4 | 1;4 | 4;9 | 3;4 | 4;4 | 5;4 | 6;4 | 7;4 |
| 0;5 | 1;5 | 3;9 | 3;5 | 4;5 | 5;5 | 6;5 | 7;5 |
| 0;6 | 1;6 | 6;9 | 3;6 | 4;6 | 5;6 | 6;6 | 7;6 |
| 0;7 | 1;7 | 2;7 | 3;7 | 4;7 | 5;7 | 6;7 | 7;7 |
| 0;8 | 1;8 | 5;9 | 3;8 | 4;8 | 5;8 | 6;8 | 7;8 |
| 2;0 | 2;2 | 2;1 | 2;5 | 2;4 | 2;8 | 2;6 | 2;3 |

Legend:
- 0;0 Data
- 0;9 Column parity
- 7;3 Row parity
- 6;8 Global parity
- 2;1 Failed or Missing
- 2;2 Data (exchanged)

FIG. 7B

AUTONOMIC PARITY EXCHANGE IN DATA STORAGE SYSTEMS

BACKGROUND

The present invention relates to data storage systems, and more specifically, this invention relates to configuring a data storage system such that it tolerates an increased number of storage element failures Maintaining data access is an important requirement in cloud systems, as is minimizing acquisition cost and ownership cost. To ensure data access, a cloud system may implement storage using a two-dimensional array in which every column is a set or JBOD (Just a Bunch of Disks) with a common failure mechanism. Further, the sets may be protected using a Redundant Array of Independent Disks (RAID) architecture, such as RAID-5 or RAID-6. Whenever an individual disk fails in the array, the failing disk may be replaced by a spare. However, a service call may be required when the number of available spares becomes small.

Additionally, autonomic parity exchange is a concept for increasing the failure tolerance in a storage system by converting a parity disk to a data disk. However, in cloud-class systems, it is also important to protect against failures that result in the loss of an entire set of storage elements (set loss), such as an entire JBOD. Although some prior art systems can remedy the failure of individual disks or whole JBODs and even a combination of those, these systems have reduced recovery capability with respect to a combination of set loss and element loss. In particular, each set of an array may form a failure boundary, whereby a set of elements can be made unavailable or lost based on a single event. For example, the network attachment or power to a set may fail, or the set may be inadvertently removed, misconfigured, etc. When such an event occurs, a significant number of elements will be taken off-line or lost, but in a specific physical configuration. However, when parity exchange is used, then, over time, the logical configuration of the array will deviate from the initial physical configuration of the array. Accordingly, the physical failure boundaries of the array will be different from the logical failure boundaries of the array.

SUMMARY

In one general embodiment, a computer-implemented method is provided for increasing the failure tolerance of an array of storage elements in a storage system. The computer-implemented method includes configuring an array to include a plurality of storage elements in n>1 sets of storage elements. The computer-implemented method also includes configuring an erasure-correcting code that protects against loss of at least one of the storage elements of the array and a loss of one of the sets of storage elements of the array. The erasure-correcting code is configured such that at least one column of the storage elements of the array stores row parity information, and at least one row of the storage elements of the array stores column parity information. Still yet, the computer-implemented method includes, subsequent to a failure of one of the storage elements storing data, selecting a recipient storage element from the array. Additionally, the computer-implemented method includes rebuilding at least a portion of the data onto the recipient storage element by performing a parity exchange operation that retains a failure tolerance of the set of storage elements containing the failed storage element.

In another general embodiment, a computer program product is provided for increasing the failure tolerance of an array of storage elements in a storage system. The computer program product comprises a computer readable storage medium having program instructions embodied therewith. The program instructions are executable by a processor to cause the processor to configure an array to include a plurality of storage elements in n>1 sets of storage elements. Moreover, the program instructions are executable by the processor to cause the processor to configure an erasure-correcting code that protects against loss of at least one of the storage elements of the array and a loss of one of the sets of storage elements of the array. The erasure-correcting code is configured such that at least one column of the storage elements of the array stores row parity information, and at least one row of the storage elements of the array stores column parity information. Also, the program instructions are executable by the processor to cause the processor to, subsequent to a failure of one of the storage elements storing data, select a recipient storage element from the array. Additionally, the program instructions are executable by the processor to cause the processor to rebuild at least a portion of the data onto the recipient storage element by performing a parity exchange operation that retains a failure tolerance of the set of storage elements containing the failed storage element.

In another general embodiment, a system is provided that includes a processor and logic integrated with and/or executable by the processor. The logic is configured to configure an array to include a plurality of storage elements in n>1 sets of storage elements. Also, the logic is configured to configure an erasure-correcting code that protects against loss of at least one of the storage elements of the array and a loss of one of the sets of storage elements of the array. The erasure-correcting code is configured such that at least one column of the storage elements of the array stores row parity information, and at least one row of the storage elements of the array stores column parity information. In addition, the logic is configured to, subsequent to a failure of one of the storage elements storing data, select a recipient storage element from the array, and rebuild at least a portion of the data onto the recipient storage element by performing a parity exchange operation that retains a failure tolerance of the set of storage elements containing the failed storage element.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 illustrates a logical arrangement of an array, in accordance with one embodiment.

FIGS. 4A-7B illustrate the failure and rebuilding of storage elements of the array of FIG. 3, in accordance with various embodiments.

DETAILED DESCRIPTION

Figure 1:
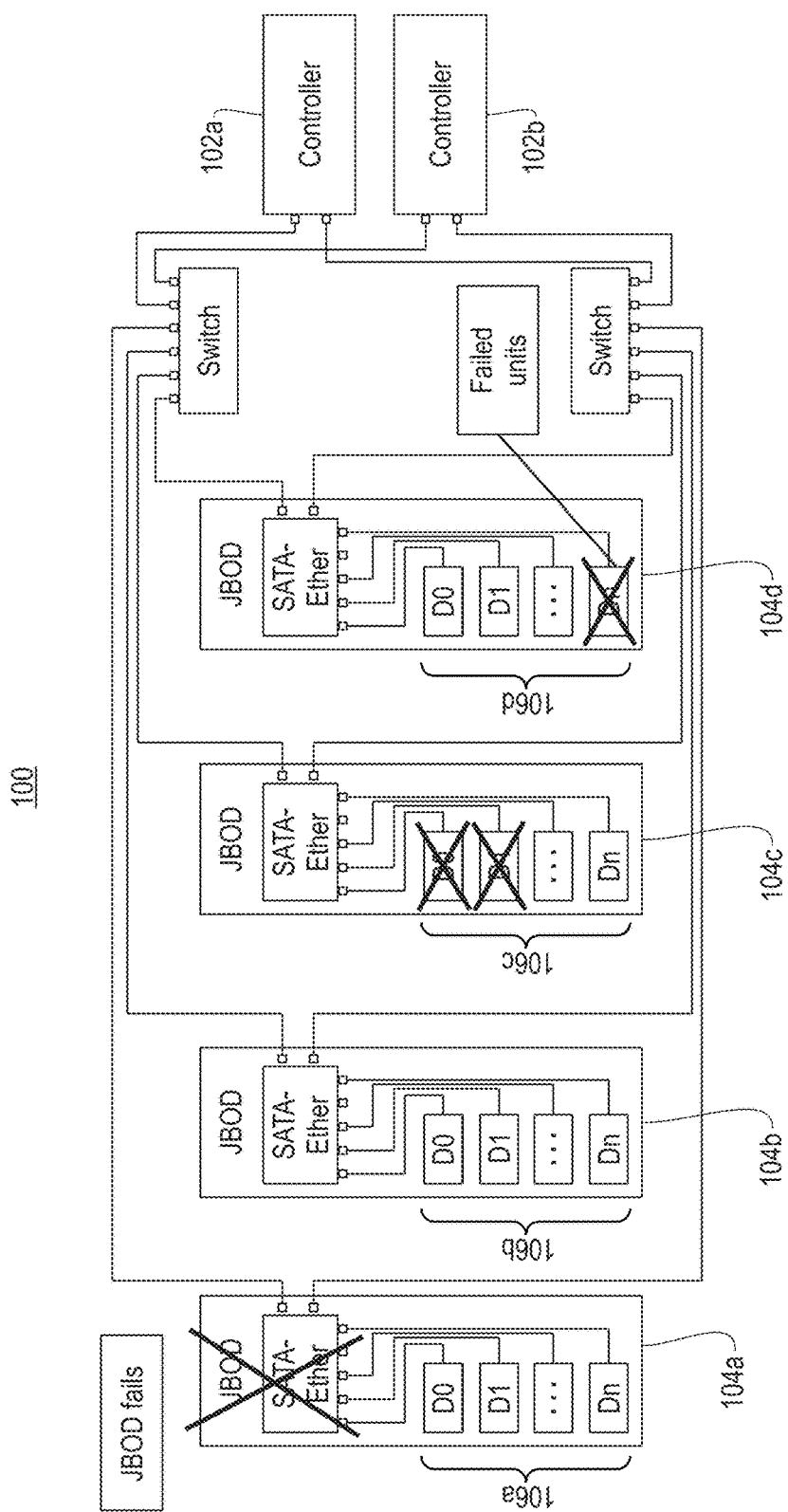
FIG. 1 illustrates a general physical layout for a storage array, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for autonomic parity exchange in cloud systems.

The below described embodiments provide array configuration and failure tolerance methods that may be applied to systems with many different physical configurations of storage elements. In any of the embodiments, a storage system, such as a cloud system, may be configured to provide high availability with high data efficiency, as well as low acquisition cost and deferred maintenance capabilities.

In one general embodiment, a computer-implemented method is provided for increasing the failure tolerance of an array of storage elements in a storage system. The computer-implemented method includes configuring an array to include a plurality of storage elements in n>1 sets of storage elements. The computer-implemented method also includes configuring an erasure-correcting code that protects against loss of at least one of the storage elements of the array and a loss of one of the sets of storage elements of the array. The erasure-correcting code is configured such that at least one column of the storage elements of the array stores row parity information, and at least one row of the storage elements of the array stores column parity information. Still yet, the computer-implemented method includes, subsequent to a failure of one of the storage elements storing data, selecting a recipient storage element from the array. Additionally, the computer-implemented method includes rebuilding at least a portion of the data onto the recipient storage element by performing a parity exchange operation that retains a failure tolerance of the set of storage elements containing the failed storage element.

In another general embodiment, a computer program product is provided for increasing the failure tolerance of an array of storage elements in a storage system. The computer program product comprises a computer readable storage medium having program instructions embodied therewith. The program instructions are executable by a processor to cause the processor to configure an array to include a plurality of storage elements in n>1 sets of storage elements. Moreover, the program instructions are executable by the processor to cause the processor to configure an erasure-correcting code that protects against loss of at least one of the storage elements of the array and a loss of one of the sets of storage elements of the array. The erasure-correcting code is configured such that at least one column of the storage elements of the array stores row parity information, and at least one row of the storage elements of the array stores column parity information. Also, the program instructions are executable by the processor to cause the processor to, subsequent to a failure of one of the storage elements storing data, select a recipient storage element from the array. Additionally, the program instructions are executable by the processor to cause the processor to rebuild at least a portion of the data onto the recipient storage element by performing a parity exchange operation that retains a failure tolerance of the set of storage elements containing the failed storage element.

In another general embodiment, a system is provided that includes a processor and logic integrated with and/or executable by the processor. The logic is configured to configure an array to include a plurality of storage elements in n>1 sets of storage elements. Also, the logic is configured to configure an erasure-correcting code that protects against loss of at least one of the storage elements of the array and a loss of one of the sets of storage elements of the array. The erasure-correcting code is configured such that at least one column of the storage elements of the array stores row parity information, and at least one row of the storage elements of the array stores column parity information. In addition, the logic is configured to, subsequent to a failure of one of the storage elements storing data, select a recipient storage element from the array, and rebuild at least a portion of the data onto the recipient storage element by performing a parity exchange operation that retains a failure tolerance of the set of storage elements containing the failed storage element.

FIG. 1 illustrates a general physical layout for a storage array 100. In various embodiments, the storage array 100 may provide cloud-class storage over a network, such as the Internet. As illustrated in FIG. 1, the storage array 100 includes a plurality of JBODs (Just a Bunch Of Disks) 104, each of which is a storage set. In particular, FIG. 1 illustrates the storage array 100 as including four sets 104 (104a, 104b, 104c, and 104d). Further, each set 104 may connect two or more storage elements 106 (e.g., serial AT attachment (SATA) drives, etc.) to one or more Ethernet ports. Additionally, each Ethernet port may be connected to an Ethernet switch, and each Ethernet switch may be connected to one or more controllers 102. The controllers 102 may be embodied as software and/or hardware. As an option, the sets 104 may be co-located. However, in some embodiments, the sets 104 are not co-located. For example, each of the sets 104a, 104b, 104c, and 104d may be located in separate data centers.

For simplicity, the storage array 100 of FIG. 1 is shown to comprise four sets 104. Moreover, the four sets 104 are shown connected to two switches, which are each in turn connected to controller 102a and controller 102b. However, it is contemplated that embodiments disclosed herein may be implemented in a storage array comprising any suitable number of sets 104. Such a storage array may be connected to any number of switches and controllers.

Further, each set 104 is shown to include a plurality of storage elements 106 (D0, D1 . . . Dn). In particular, the set 104a is shown to include storage elements 106a, the set 104b is shown to include storage elements 106b, the set 104c is shown to include storage elements 106c, and the set 104d is shown to include storage elements 106d. Each storage element may comprise at least a portion of a hard disk drive (HDD), a solid state drive (SSD), a volatile Random Access Memory (RAM) device, a non-volatile RAM device, an optical storage device (e.g., CD-ROM, DVD-ROM, etc.), or a tape storage device. There may be tens, hundreds, or thousands of storage elements in each of the sets 104.

Data can be lost by losing a storage element 106, such as a disk or portion of a disk, or by losing an entire one of the sets 104. Each of the sets 104 may form a failure boundary, such that the storage elements 106 of a given set 104 may be made unavailable or lost based on a single event. In most circumstances, an entire set 104 is lost due to loss of access. For example, a set 104 may be lost due to power or network connectivity interruption, such as when a network attachment or power supply fails, or if the set 104 has been removed inadvertently, or misconfigured, etc. When a set 104 is lost due to loss of access, data on the storage elements 106 of the set 104 is typically unaffected. Once repair is complete, the data on the storage elements 106 may be once again accessible, but perhaps slightly out of date.

However, it is possible for a failure of a set 104 to result in the loss of one or more of the storage elements 106 within the set 104. For example, as a result of a power surge, damage to the set 104, or improper removal of the JBOD 104. The embodiments disclosed herein are capable of providing protection under the above-described conditions.

Each controller 102 (e.g. controller 102a and/or controller 102b) may include some combination of a central processing unit, such as a microprocessor, and a number of other units interconnected. For example, each controller 102 shown in FIG. 1 may include Random Access Memory (RAM), Read Only Memory (ROM), an I/O adapter for connecting peripheral devices, a user interface adapter, a communication adapter, etc. Still yet, an embodiment of the controller may be written using XML, C, and/or C++ language, or other programming languages, along with an object oriented programming methodology.

Moreover, as described in more detail below, one or more of the storage elements physically located in a first set may be logically assigned to a second, different, set that physically houses other storage elements. Accordingly, donating a storage element from a donor set to a recipient set may require that a controller 102 is able to logically assign storage elements in the first set to the second set, and vice versa. If donor and recipient sets are managed by separate controllers 102, then the controllers 102 may exchange information regarding the logical assignment of storage elements.

Figure 2:
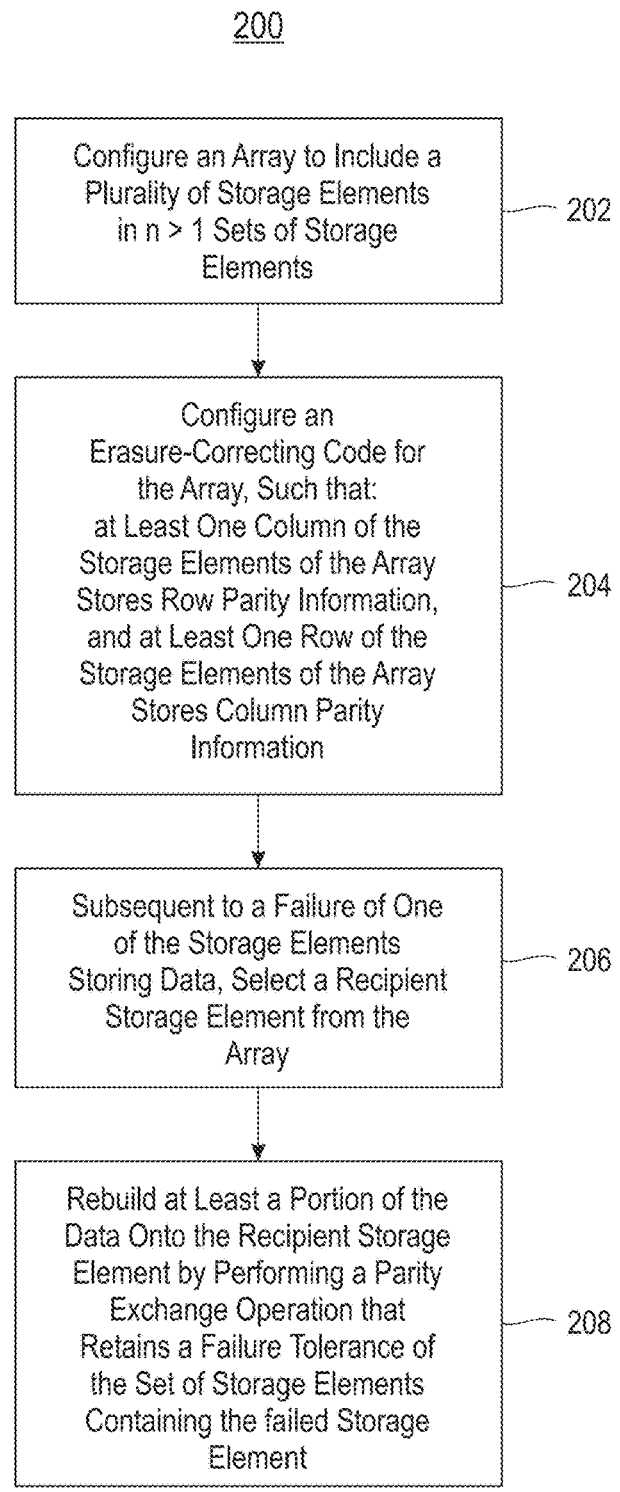
FIG. 2 illustrates a method for increasing the failure tolerance of a storage array, in accordance with one embodiment.

Now referring to FIG. 2, a flowchart of a method 200 is shown according to one embodiment. The method 200 may be performed in accordance with the present invention in any of the environments depicted in FIG. 1, among others, in various embodiments. Of course, more or less operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 200 initiates with operation 202, where an array is configured to include a plurality of storage elements in n>1 sets of storage elements. For example, the array may be configured to include 3, 5, 8, 12, etc. sets of storage elements. Moreover, each set of storage elements may share a failure boundary. In one embodiment, each set of storage elements may comprise a JBOD. Accordingly, the array may be configured to include a plurality of JBODs, and each JBOD of the array includes two or more storage elements.

Additionally, at operation 204, an erasure-correcting code is configured for the array. As described in more detail below, the erasure-correcting code protects against the loss of at least one of the storage elements of the array, in addition to a loss of one of the sets of storage elements of the array. The erasure-correcting code is configured such that at least one column of the storage elements of the array stores row parity information. Additionally, the erasure-correcting code is configured such that at least one row of the storage elements of the array stores column parity information. In some embodiments, the erasure-correcting code may be configured such that at least one of the storage elements stores global parity information.

For example, FIG. 3 shows a logical arrangement of an array 300, where the array 300 is illustrated to include a plurality of storage elements. In particular, the array is illustrated to include 8 columns 322-336 (i.e., columns 322, 324, 326, 328, 330, 332, 334, and 336) of storage elements, and 10 rows 302-320 (i.e., rows 302, 304, 306, 308, 310, 312, 314, 316, 318, and 320) of storage elements. As previously noted option, each of the storage elements may comprise at least a portion of a disk, but can be any unit of data storage and capacity. As illustrated in FIG. 3, the value displayed in each of the storage elements may represent a logical location of the storage element as (set index; disk # in set). Further, each of the unshaded cells (storage elements) of FIG. 3 is representative of a storage element storing data, such as user data, and each of the shaded cells (storage elements) is representative of a storage element storing parity information, as described in more detail below.

It should be noted that in the initial state or arrangement of the array 300 depicted by FIG. 3, the logical mapping of the array 300 aligns with the physical layout of the array 300. In other words, all storage elements 0;x (set 0) are located in the column 322. Additionally, as depicted in FIG. 3, the array 300 has been configured in a manner such that the array 300 does not include spare storage elements.

Further, an erasure-correcting code is configured for the array 300 such that at least one column of storage elements stores row parity information. For example, the storage elements of the column 336 have been configured such that each storage element provides row parity for its respective row. In particular, storage element at row 0, column 7 provides row parity for the row 302, storage element at row 1, column 7 provides row parity for the row 304, and storage element at row 2, column 7 provides row parity for the row 306, etc.

Moreover, the erasure-correcting code is configured for the array 300 such that at least one row of storage elements stores column parity information. For example, the storage elements of the row 320 have been configured such that each storage element provides column parity for its respective column. In particular, storage element at row 9, column 0 provides column parity for the column 322, storage element at row 9, column 1 provides column parity for the column 324, and storage element at row 9, column 2 provides column parity for the column 326, etc. In addition, storage element at row 9 column 7 stores column parity information for the column of row parity storage elements in column 7 (column 336).

Furthermore, the erasure-correcting code is configured for the array 300 such that at least one storage element stores global parity information. For example, the array 300 is shown to include storage element 340 at row 8, column 5, and storage element 342 at row 8, column 6, each of which stores global parity information for the array 300. As shown in FIG. 3, due to the storage of global parity information at both the storage elements 340 and 342, the erasure-correcting code configured for the array 300 has a Hamming distance of 8, and thus can correct any 7 erasures. Further, it has a Hamming distance of 2 to column erasure, thus it can correct the loss of one column. In another embodiment, wherein only a single storage element is configured to store global parity information, a Hamming distance of 6 may be achieved, thus allowing the correction of any 5 erasures.

In one embodiment, each set of storage elements may be housed in a single JBOD or other physical storage unit (e.g., a cabinet, etc.). In other words, the elements with set index 0 may comprise a first set of storage elements or a first JBOD, the elements with set index 1 may comprise a second set of storage elements or a second JBOD, and the elements with set index 2 may comprise a third set of storage elements or a third JBOD, etc. In this manner, for example, the array 300 may comprise a cloud system that includes 8 JBODs, each comprising 10 storage elements (one storage element at each of the rows 302-320). Accordingly, the storage elements of any given set may share a common failure boundary. In such a cloud system, the storage elements may typically be expected to suffer from high failure rates relative to the sets housing the storage elements.

By configuring an erasure-correcting code for the array 300 such that at least one column of storage elements stores row parity information, at least one row of storage elements stores column parity information, and at least one storage element stores global parity information, the array 300 may tolerate a significant number of storage element failures, thereby extending a disk maintenance interval of the array 300. For example, the disk maintenance interval may be extended by allowing the storage elements to fail in place. As an option, only after a predetermined number of storage elements have failed in place, may a maintenance event be triggered.

Referring again to FIG. 2, subsequent to a failure of one of the storage elements storing data, a recipient storage element is selected from the array, at operation 206. Further, at operation 208, at least a portion of the data is rebuilt onto the recipient storage element by performing a parity exchange operation that retains a failure tolerance of the set of storage elements containing the failed storage element. The data may be rebuilt onto the recipient storage element in any practicable manner, such as, for example, utilizing row parity information, column parity information, or global parity information stored within one or more of the storage elements of the array.

In one embodiment, the recipient storage element is selected from the same set as the failed storage element. Still yet, the recipient storage element, when it is selected, may store column parity information. In other words, prior to rebuilding the at least a portion of the data onto the recipient storage element, the recipient storage element is one of the storage elements of the at least one row of storage elements that stores column parity information.

For example, referring to FIG. 4A, array 400 illustrates an arrangement of the array 300 of FIG. 3 after physical storage element 2; 1 has failed. Similarly, array 450 of FIG. 4B illustrates an arrangement of the array 400 after the failure of the storage element 2; 1 is mitigated by rebuilding, within the column 326, to a recipient storage element data previously stored on the failed storage element. In other words, a single physical storage set may house the recipient storage element and the failed storage element. In one embodiment, data of a failed storage element may be rebuilt onto the recipient storage element by reading exclusively from other storage elements in the set of the failed storage element. Thus, the data of the failed storage element may be rebuilt without utilizing horizontal parity information or global parity information.

In particular, as shown by the array 450, the data previously stored on the storage element 2; 1 has been rebuilt to storage element 2; 9, which previously stored column parity information for the column 326. Accordingly, as illustrated by FIG. 4B, the physical storage elements 2; 1 and 2; 9 may undergo a parity exchange, by rebuilding to physical storage element 2; 9 the data previously stored on the failed storage element 2; 1. As illustrated by FIGS. 5-7, this parity exchange operation retains the failure tolerance of the third set of storage elements (i.e., the set of storage elements with set index 2, storage elements 2;x). In other words, by performing the parity exchange operation illustrated in the context of FIGS. 4A and 4B, the set including the failed storage elements may tolerate additional failures of storage elements within the set without losing any data.

The recipient storage element 2; 9 may be selected from the same set as the failed storage element in order to minimize network impact. Because storage elements 2; 1 and 2; 9 reside within the same set or JBOD, the rebuilding of logical storage element 2; 1 onto physical storage element 2; 9 may not require the transmission of data on network or data channels that are outside of the JBOD. The logical storage element at row 1, column 2 may be rebuilt using column parity. However, as an option, the rebuilding of logical storage element at row 1, column 2 onto physical storage element 2; 9 may be performed via a number of paths in the erasure-correcting code.

It should be noted that while the erasure-correcting code configured for the array 300 can tolerate any seven storage element failures, read performance may suffer if the array 300 continues to function with a failed storage element. Accordingly, parity exchange may be used to restore system performance, by rebuilding the data previously stored at the storage element 2; 1 onto one of the storage elements storing column parity information (e.g., physical storage element 2; 9, etc., as described above). Once complete, read performance may be restored. Further, write performance may be slightly increased due to the reduction in system resources required to maintain parity information.

As an option, if a storage element storing column parity information fails, such as the storage elements of row 320 of FIG. 3 (row 9, column 0; row 9, column 1; row 9, column 2; . . . row 9, column 7), no rebuild operation may be necessary. Still yet, if a storage element storing row parity information fails, such as the storage elements of column 336 of FIG. 3 (row 0, column 7; row 1, column 7; row 2, column 7; . . . row 8, column 7), then the row parity information previously stored on the failed storage element may be rebuilt. In other words, the storage elements storing row parity information may be subject to parity exchange just as the storage elements storing data are. Specifically, the data (row parity information) of the failed row parity storage element may be rebuilt onto a storage element previously used to store column parity information.

Additionally, there may be a choice with respect to whether to perform a rebuild operation when the failed storage element was storing global parity information. As an option, if, after failure of a storage element previously storing global parity information, column parity remains intact, then the failure may be left as-is. In this manner, the failed storage element may act as if it was a parity exchange donor. Maintaining tolerance to a combination of set and element loss limits the number of donor parities in a column to the number of column parities in the column.

As another option, each storage element storing global parity information may be treated as a storage element storing user data, and exchanged with a column parity storage element in the event of a failure of the storage element storing global parity information. From a performance perspective, this may be preferable to leaving the failure as-is, because global parity information can be built using local column parity if there is only one failure in the column, thereby saving on bandwidth. Additionally, if, after failure of a storage element previously storing global parity information, the global parity information is not rebuilt, and further storage elements within the array experience failure, then any subsequent rebuild of the global parity information may become a more computationally intensive repair.

One or more additional storage elements may experience failure. For example, referring now to FIG. 5A, array 500 illustrates a logical arrangement of the array 450 after the failure of an additional storage element. As noted above, the physical storage element 2; 9 has previously been rebuilt with the data formerly stored at failed physical storage element 2; 1 such that the physical storage element 2; 9 is logically mapped to storage element at row 1, column 2. As shown in FIG. 5A, storage element 2; 0 has failed.

The storage element at row 0, column 2 may be rebuilt by selecting a recipient storage element from the array, and then rebuilding onto the recipient storage element at least a portion of the data previously stored on the storage element 2; 0. In one embodiment, the recipient storage element, prior to the rebuild operation, may be another one of the storage elements that store column parity information. As an option, the recipient storage element may be selected from a different set or JBOD of the array as the failed storage element.

In one embodiment, where the array has been configured to include n>1 sets of storage elements, then up to n failed storage elements may be rebuilt in the manner described above. For example, in the context of FIGS. 3-5, where the array 300 was configured to include eight sets of storage elements (i.e., eight JBODs), then up to eight failed storage elements may be rebuilt in the manner described above. Specifically, each storage element of up to eight failed storage elements may be rebuilt onto one of the eight storage elements originally storing column parity information in the row 320 of the array 300. In various embodiments, a maintenance event may be triggered upon or in response to the failure of ≤n storage elements. For example, in the context of FIGS. 3-5, the maintenance event may be triggered upon the eighth failure of a storage element, upon the sixth failure of a storage element, upon the fourth failure of a storage element, etc.

The fact that failed storage elements 2; 0 and 2; 1 are located in the same set may be representative of a worst-case storage element loss scenario, where multiple storage elements fail within a single set. Because there is no longer a storage element within set 2 storing column parity information, a storage element storing parity information may be selected from another one of the sets of the array 500. In other words, set-local parity is no longer available in set 2, so the recipient storage element for rebuilding the data of storage element 2; 0 may be chosen from one of the storage elements storing parity information in one of the other sets of the array 500.

For example, referring to FIG. 5B, an array 550 illustrates an arrangement of the array 500 after the failure of the storage element 2; 0 is mitigated by rebuilding, to a recipient storage element of another set, data previously stored on the storage element 2; 0. Thus, the data formerly stored on the physical storage element 2; 0 of set 2 has been rebuilt to the physical storage element 0; 9 of a different set (set 0). The data of logical storage element at row 0, column 2 may be rebuilt using row parity information for row 0, since the column parity information for column 2 was previously overwritten.

In this manner, the physical storage element 0; 9 may be logically mapped to the storage element at row 0, column 2. Accordingly, after parity exchange is complete, data from a first set now physically resides in a different set. In particular, data from logical column 326 now resides on a storage element in set 0. As a consequence of performing a parity exchange operation between storage elements of the columns 322 and 326, a logical map of the array 550 is no longer aligned with failure boundaries of the sets or JBODs.

By allowing the selection of recipient storage elements that violate the failure boundaries of sets or JBODs, additional parity exchange operations may be performed as additional storage elements fail within the array 550. For example, referring now to FIG. 6A, array 600 illustrates a logical arrangement of the array 550 after the failure of six additional storage elements, and the subsequent parity exchanges.

In particular, as illustrated by FIG. 6A, all storage elements within set 2, except for storage element 2; 7, have failed. Further, a parity exchange has been performed for each of the storage elements of set 2 such that each storage element of set 2 has been rebuilt onto a recipient storage element of the row 320. In other words, each of the storage elements of the row 320, which was previously configured by the erasure-correcting code to store column parity information, is now storing data. Specifically, within FIG. 6A, physical storage element 0; 9 is mapped to the logical storage element at row 0, column 2, physical storage element 1; 9 is mapped to the logical storage element at row 2, column 2, physical storage element at row 9, column 3 is mapped to the logical storage element at row 5, column 2, physical storage element 4; 9 is mapped to the logical storage element at row 4, column 2, etc.

As a result, all data of the original array 300 remains directly accessible, but all column parity information is now missing. Furthermore, data originally stored in set 2 now resides within all of the sets 0;x . . . 7;x (i.e., 8 different sets) of the original array 300. As a result, the array 600 may be able to tolerate only one additional storage element failure, in addition to the loss of a set. As an option, when the array of a cloud system is only able to tolerate the additional failure of a single storage element and a set, then the system may request maintenance. A maintenance event may include, for example, the installation of spare or replacement storage elements to replace the storage elements that have failed.

To minimize the risk of failure during maintenance, the cloud system may be configured to tolerate one further storage element failure during maintenance. Therefore, any maintenance may be performed at a Hamming distance of 2 to storage elements.

As noted, the array 600 of FIG. 6A is able to tolerate the failure of one additional storage element and a set. This scenario is illustrated by the array 650 of FIG. 6B. In particular, as shown in FIG. 6B, an entire set (i.e., set 0) has been removed from the array 650. Consequently, all of the storage elements comprising the column 322 have failed or been lost. As a result, the data of physical storage element 0; 9 is lost. This physical storage element contains data from the logical storage element at row 0, column 2. Note that after parity exchange, the logical storage element map no longer aligns with the physical failure boundaries of a set. Thus, loss of a set can impact more than one column in the logical map.

The physical storage element 1; 1 has also failed or been lost. The consequences of losing failure boundary alignment are made clear by the storage element failures and set loss of the array 650. In particular, the column 326 has lost two storage elements, one of which was logically mapped to the column 322.

As a result, 19 storage elements of the array 650 are currently lost or unavailable. However, an erasure-correcting code previously configured for the array 650 may be able to recover from these losses because previous parity exchange operations have placed the failures in a particular pattern.

In one embodiment, row parity information may be utilized to correct the storage element failures of the array 650. In particular, the row parity information of the storage elements of the column 336 may be utilized to correct the storage element failures of the array 650.

For example, referring now to FIG. 7A, array 700 illustrates a logical arrangement of the array 650 after rebuilding physical storage elements 0; 2, 0; 3, 0; 4, 0; 5, 0; 6, 0; 7, and 0; 8 of the column 322 utilizing the corresponding row parity information in the physical storage elements from each of the rows 2, 3, 4, 5, 6, 7, and 8, respectively, and a row parity equation. The row parity equation may be utilized to repair any given row having a single erasure. As a result, 12 failures remain.

Column parity information may be utilized to correct the storage element failures of the array 700. For example, array 750 illustrates a logical arrangement of the array 700 after rebuilding logical storage elements at row 9, column 3; row 9, column 4; row 9, column 5; row 9, column 6; and row 9, column 7 of the row 320 utilizing column parity information and a column parity equation. The column parity equation may be utilized to repair any given column having a single erasure. As a result, 7 failures remain.

In some scenarios, row parity information and column parity information may be recursively utilized to rebuild the missing or failed storage elements of the array. For example, in some scenarios, after applying the row parity equations and the column parity equations, one or more storage element erasures or failures may be remedied by subsequent applications of the row parity equations and the column parity equations.

Still yet, utilizing the global parity information stored in the storage elements 340 (5; 8) and 342 (6; 8), all data is fully available, and the remaining 7 failures may be fixed. It is anticipated that there may be a performance impact during reconstruction of the 7 remaining erasures.

In one embodiment, after maintenance is complete, set failure boundaries may be restored for the exchanged storage elements. This may include exchanging data parities from different JBODs, most of which are simple operations. For example, referring again to FIG. 7B, storage element 2; 0 should have the data copied from storage element 0; 9. The same is true for the other storage elements. Where parity exchange was performed internal to a set (i.e., between storage elements of a single set), failure boundaries may be unaffected. Accordingly, such parity exchange operations may not require the subsequent restoration of failure boundaries.

After restoring set failure boundaries, column parity information may be rebuilt onto a storage element in each set using local parity equations that utilize only the storage elements in each respective set.

In the context of FIGS. 3-7, the erasure-correcting code may provide a greater distance than a product code. Further, by performing parity exchange operations in the manner described above, a distance 2 to further set loss and storage element loss may be afforded. When using the erasure-correcting code with two global parities (e.g., the storage elements 340 and 342), the deferral limit may be the set count, and each of the parity exchanges may preferably be performed using set (column) parities.

In this manner, in a cloud system comprising n sets of m storage elements, the cloud system may perform n parity exchanges prior to maintenance, and may experience no data loss after further failure of one of the sets and one of the storage elements.

Although the above description notes that maintenance may be requested when the system can only tolerate the additional failure of a single storage element and a set, it is understood that maintenance may be requested sooner or later than this point. As an option, the system may be configured to request maintenance at any point. For example, although the erasure-correcting code can handle any 7 failures, the system may be configured to call for maintenance when a cluster of fewer than 7 errors occurs. For example, a cluster of 6 failures might be chosen as a maintenance request threshold. Such a configuration may be chosen to ensure the integrity and robustness of the system.

Still yet, the above embodiments provide methods and systems for increasing the loss tolerance of a cloud system to both storage element loss and set loss. In particular, the erasure-correcting code described above tolerates tolerate 8 fail-in-place storage element losses, while being robust to the further loss of an entire set and storage element during maintenance.

The erasure-correcting code described above may provide the same performance as an MDS code with 19 parities. However, such an MDS code requires 19 global parities. Moreover, an MDS code does not have a first responder approach towards single storage element failures.

In addition, the erasure-correcting code described above in the context of FIGS. 3-7 is highly efficient. Specifically, as described in context of FIGS. 3-7, the erasure-correcting code allows the array to be configured such that 76.25% of the storage elements initially store data, with no spares required. Additionally, the erasure-correcting code tolerates a loss of 23.75% of the capacity of the array after parity exchange, and allows the deferral of maintenance until 10% of the capacity is lost. Accordingly, the embodiments disclosed above may considerably lengthen the time to service of cloud system storage arrays.

Figure 8:
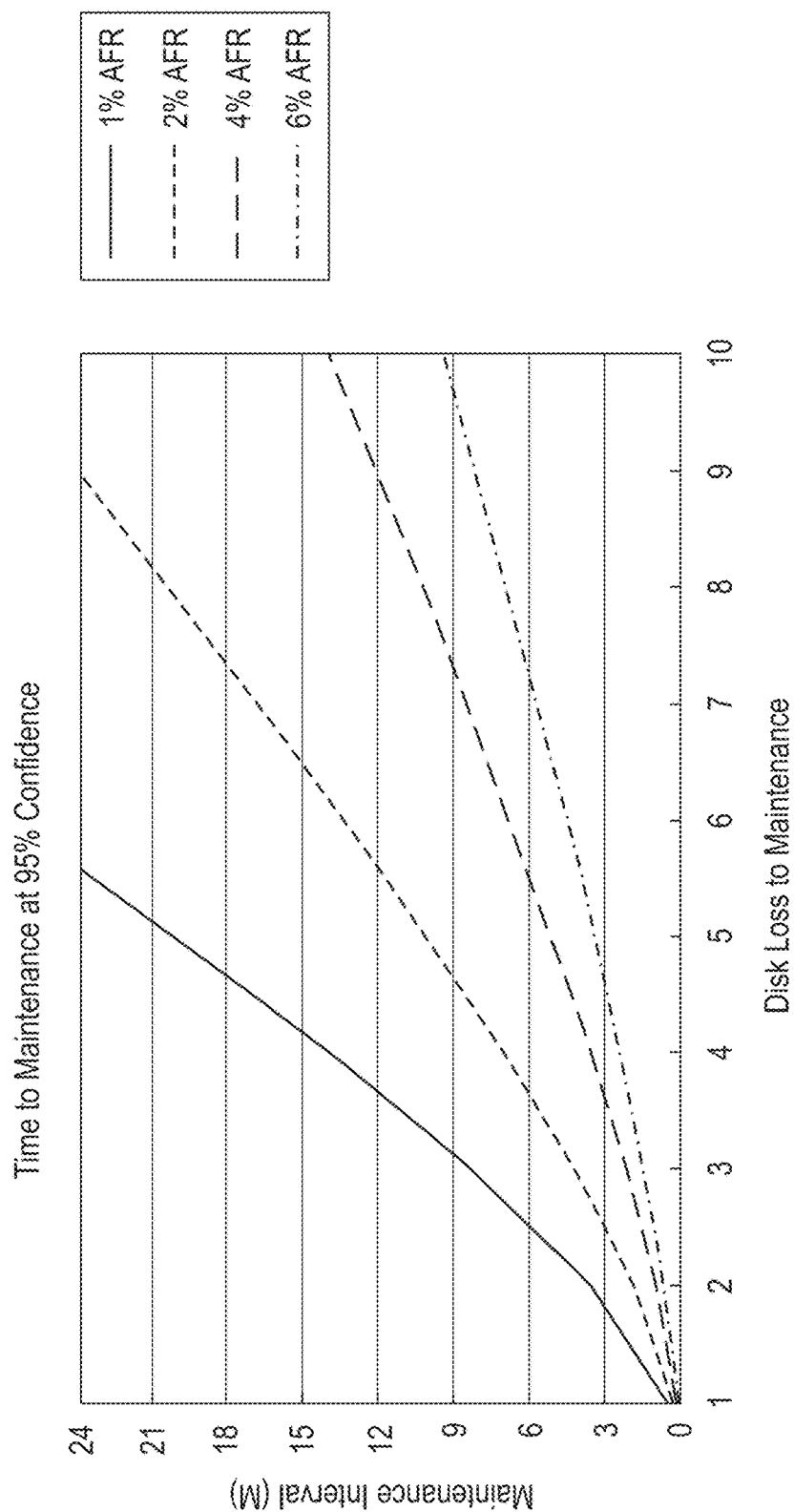
FIG. 8 is a graph of anticipated time to maintenance for a cloud system employing, in accordance with one embodiment.

Referring now to FIG. 8, anticipated time to maintenance is plotted for a cloud system employing the erasure-correcting code described in FIGS. 2-7. As shown in FIG. 8, increasing the tolerance of a cloud system to lost storage elements may significantly increase the maintenance interval of the cloud system.

For example, a system with 8 sets holding 15 storage elements each includes a total of 120 storage elements. Using the erasure-correcting code described above, the system can defer up to 8 storage elements. FIG. 8 shows that even at a 6% annual failure rate for the storage elements, there is only a 5% chance that the 8 storage elements would be lost in less than 6.5 months. Thus, use of the erasure-correcting code provides the ability to significantly increase the maintenance intervals over prior-art systems.

The method described above has been illustrated using a single logical map for the erasure-correcting code. The method may be easily extended to support parity rotation or declustering to reduce the rebuild load. In such cases, there will be a set of maps with different parity locations for different portions of storage space on the storage units. For example, there can be 10 different versions of the array 300, with the parity row being row 0 in the first array, row 1 in the second array, and so on. This affects a rotation of the column parities. Each map would be used for a portion of the storage space on each unit. For example, the first 10% may use the first rotation, the second 10% the second rotation, and so on. Thus when a first storage unit fails, it will contain 90% data and 10% parity. Thus on parity exchange, the write workload is spread across all the storage units in the set, reducing the parity exchange duration.

While the various embodiments disclosed herein have been described to include n sets (e.g., JBODs, etc.) of m storage elements, it should be apparent that each set does not need to contain m storage elements. For example, m may be set to the maximum number of elements in a set, and virtual storage elements may be assigned to any set having <m storage elements. Further, it should be apparent that the methods disclosed herein may be extended to storage systems with other than one parity storage element per row or one parity storage element per column (e.g., 2 column parity storage elements in a column, etc.).

Still yet, the above-described array configuration and failure tolerance methods may be applied to systems with many different physical configurations of storage elements. For example, as noted above, the storage elements may be locations on disks, and each set of storage elements may comprise a JBOD. As another example, in embodiments employing SSDs, each storage element may comprise a page, and each set of storage elements may comprise an erase block. As yet another example, in embodiments employing SSDs, each storage element may comprise a page, and each set of storage elements may comprise a flash die. Further still, each of the storage elements may comprise a disk array or JBOD, and each of the sets may comprise a larger grouping of arrays, such as racks. Further, the racks may be isolated for power failures, such as by installation of the racks in separate physical locations and/or data centers.

In any of embodiments described above, a storage system, such as a cloud system, may be configured to provide high availability with high data efficiency, as well as low acquisition cost and deferred maintenance capabilities. Deferring maintenance of a cloud system may be seen as a feasible approach when system performance is not degraded by the deferment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for increasing failure tolerance of an array of storage elements in a storage system, comprising:
    configuring an array to include a plurality of storage elements in n>1 sets of storage elements;
    configuring an erasure-correcting code that protects against loss of any data stored in the array resulting from a failure of at least one of the storage elements of the array and a failure of a complete one of the sets of storage elements of the array, wherein storage elements in a same column are in a same set, wherein the erasure-correcting code is configured such that:
        a column of the storage elements of the array stores row parity information, and
        a row of the storage elements of the array stores column parity information;
    subsequent to a failure of one of the storage elements storing data, selecting a recipient storage element from the array; and
    rebuilding at least a portion of the data stored in the failed storage element onto the recipient storage element by performing a parity exchange operation that retains a failure tolerance of the set of storage elements containing the failed storage element.

2. The computer-implemented method of claim 1, comprising in response to experiencing n storage element failures, initiating replacement of each of the failed storage elements.

3. The computer-implemented method of claim 1, wherein all storage elements in a same column are in a same set, wherein each of the storage elements in a same set are in a same Just a Bunch of Disks.

4. The computer-implemented method claim 1, wherein the erasure-correcting code is configured such that at least two of the storage elements store global parity information, wherein the erasure-correcting code has a Hamming distance of n to element failure.

5. The computer-implemented method of claim 1, wherein the recipient storage element is selected from the row of the storage elements that stores column parity information, such that the recipient storage element, prior to rebuilding the at least a portion of the data included column parity information.

6. The computer-implemented method of claim 5, wherein the recipient storage element is in the same set of the array as the failed storage element, wherein the recipient storage element and the failed storage element share a failure boundary, wherein the recipient storage element and the failed storage element are included in the same Just a Bunch of Disks (JBOD).

7. The computer-implemented method of claim 6, wherein each of the storage elements in a same set are included in a same Just a Bunch of Disks (JBOD), wherein the erasure-correcting code is configured such that it protects against loss of any data stored in the array resulting from a failure of n+1 of the storage elements of the array.

8. A computer program product for increasing failure tolerance of an array of storage elements in a storage system, the computer program product comprising a computer readable storage medium having program instructions embodied therewith, the program instructions executable by a processor to cause the processor to:
configure, by the processor, an array to include a plurality of storage elements in n>1 sets of storage elements;
configure, by the processor, an erasure-correcting code that protects against loss of any data stored in the array resulting from a failure of n+1 storage elements of the array and a failure of a complete one of the sets of storage elements of the array, wherein storage elements in a same column are in a same set, wherein the erasure-correcting code is configured such that:
a column of the storage elements of the array stores row parity information, and
a row of the storage elements of the array stores column parity information;
subsequent to a failure of one of the storage elements storing data, select, by the processor, a recipient storage element from the array; and
rebuild, by the processor, at least a portion of the data stored in the failed storage element onto the recipient storage element by performing a parity exchange operation that retains a failure tolerance of the set of storage elements containing the failed storage element.

9. The computer program product of claim 8, the program instructions executable by the processor to cause the processor to initiate replacement of each of the failed storage elements in response to experiencing n storage element failures, wherein the replacement storage element is selected from the n>1 sets of storage elements in the array.

10. The computer program product of claim 9, wherein each of the plurality of storage elements are a portion of a same physical data storage device, wherein the same physical data storage device is a solid state drive.

11. The computer program product of claim 8, wherein the erasure-correcting code is configured such that at least two of the storage elements store global parity information, wherein the erasure-correcting code has a Hamming distance of n to element failure.

12. The computer program product of claim 8, wherein the recipient storage element is selected from the row of the storage elements that stores column parity information, such that the recipient storage element, prior to rebuilding the at least a portion of the data, included column parity information.

13. The computer program product of claim 12, wherein the recipient storage element is in the same set of the array as the failed storage element, wherein the recipient storage element and the failed storage element share a failure boundary.

14. The computer program product of claim 13, wherein the recipient storage element and the failed storage element are included in the same Just a Bunch of Disks (JBOD), wherein all storage elements in the same column are in a same set.

15. A system, comprising:
a processor and logic integrated with and/or executable by the processor, the logic being configured to:
configure an array to include a plurality of storage elements in n>1 sets of storage elements;
configure an erasure-correcting code that protects against loss of any data stored in the array resulting from a failure of n+1 storage elements of the array and a failure of a complete one of the sets of storage elements of the array, wherein all storage elements in a same column are in a same set, wherein the erasure-correcting code is configured such that:
one column of the storage elements of the array stores row parity information, and
one row of the storage elements of the array stores column parity information;
subsequent to a failure of one of the storage elements storing data, select a recipient storage element from the n>1 sets of storage elements in the array; and
rebuild at least a portion of the data stored in the failed storage element onto the recipient storage element by performing a parity exchange operation that retains a failure tolerance of the set of storage elements containing the failed storage element.

16. The system of claim 15, the logic being configured to: subsequent to a failure of a second of the storage elements storing data, select a second recipient storage element from the n>1 sets of storage elements in the array, wherein the recipient storage element and the second recipient storage element are both selected from the row of the storage elements that stores column parity information, wherein the second recipient storage element is located in a different set than the recipient storage element; and rebuild at least a portion of the data stored in the second failed storage element onto the second recipient storage element by performing a parity exchange operation that retains a failure tolerance of the set of storage elements containing the second failed storage element, wherein the failed storage element and the second failed storage element are in the same set of the array, wherein the recipient storage element is in the same set of the array as the failed storage element, such that the recipient storage element and the failed storage element share a failure boundary, wherein the second recipient storage element is not in the same set of the array as the second failed storage element, such that the second recipient storage element and the second failed storage element do not share a failure boundary.

17. The system of claim 16, the logic being configured to initiate replacement of the failed storage element in response to reaching n storage element failures, wherein the erasure-correcting code is configured such that two of the storage elements stores global parity information, wherein the erasure-correcting code has a Hamming distance of n.

18. The system of claim 15, wherein the erasure-correcting code is configured such that at least two of the storage elements store global parity information, and the erasure-correcting code has a Hamming distance of n to element failure.

19. The system of claim 18, wherein the recipient storage element is selected from the row of the storage elements that stores column parity information, such that the recipient storage element, prior to rebuilding the at least a portion of the data included column parity information.

20. The system of claim 19, wherein the recipient storage element is in the same set of the array as the failed storage element, such that the recipient storage element and the failed storage element share a failure boundary.

21. The system of claim 20, wherein each of the plurality of storage elements are a portion of a same physical data storage device, wherein the same physical data storage device is a solid state drive.

* * * * *